United States Patent
Harvey et al.

(10) Patent No.: US 12,156,360 B2
(45) Date of Patent: Nov. 26, 2024

(54) CONTROLLER WITH MOVEABLE INTERACTIVE SCREEN

(71) Applicant: PassiveLogic, Inc., Salt Lake City, UT (US)

(72) Inventors: Troy Aaron Harvey, Brighton, UT (US); Jeremy David Fillingim, Salt Lake City, UT (US)

(73) Assignee: PassiveLogic, Inc., Holladay, UT (US)

( * ) Notice: Subject to any disclaimer, the term of this patent is extended or adjusted under 35 U.S.C. 154(b) by 911 days.

(21) Appl. No.: 17/204,668

(22) Filed: Mar. 17, 2021

(65) Prior Publication Data

US 2022/0066722 A1      Mar. 3, 2022

Related U.S. Application Data

(60) Provisional application No. 63/070,460, filed on Aug. 26, 2020.

(51) Int. Cl.
*A01G 23/10* (2006.01)
*F24F 11/32* (2018.01)
(Continued)

(52) U.S. Cl.
CPC ............ *H05K 7/1465* (2013.01); *F24F 11/32* (2018.01); *F24F 11/49* (2018.01); *F24F 11/63* (2018.01);
(Continued)

(58) Field of Classification Search
CPC .. F24F 11/32; F24F 11/63; F24F 11/68; F24F 11/49; H04W 4/80; G06F 3/04186; G06F 30/18; G06F 30/13; G06F 30/12
(Continued)

(56) References Cited

U.S. PATENT DOCUMENTS

| 4,353,653 A | 10/1982 | Zimmerman |
| 5,208,765 A | 5/1993 | Turnbull |

(Continued)

FOREIGN PATENT DOCUMENTS

| CN | 103926912 B | 5/2014 |
| CN | 206002869 U | 8/2016 |

(Continued)

OTHER PUBLICATIONS

BigLadder Software Full Ref, Occupant Thermal Comfort: Engineering Reference, 2014, the Board of Trustees of the University of Illinois and the Regents of the University of California through the Ernest Orlando Lawrence Berkeley National Laboratory (Year: 2014).

(Continued)

*Primary Examiner* — Davis D Hwu

(57) ABSTRACT

A building controller with wiring terminals that has a moveable interactive screen is disclosed. The moveable interactive screen, when closed, covers the housing that holds the wiring terminals. The specific devices attached to specific terminals and the state of the devices can be displayed on the closed moveable interactive screen. Using the moveable interactive screen, a user can set up the expected devices and their protocols that will be attached to specific wiring terminals within the building controller. The controller wiring terminals can be viewed along with an interactive diagram of the devices and the terminals that have been set up for the building controller can be viewed simultaneously when the moveable interactive screen is in the open position.

19 Claims, 13 Drawing Sheets

(51) Int. Cl.

| | | |
|---|---|---|
| *F24F 11/49* | (2018.01) | |
| *F24F 11/63* | (2018.01) | |
| *F24F 11/88* | (2018.01) | |
| *G01R 31/55* | (2020.01) | |
| *G05B 13/02* | (2006.01) | |
| *G05B 15/02* | (2006.01) | |
| *G05B 19/048* | (2006.01) | |
| *G05B 23/02* | (2006.01) | |
| *G06F 1/3209* | (2019.01) | |
| *G06F 1/3246* | (2019.01) | |
| *G06F 3/041* | (2006.01) | |
| *G06F 3/0482* | (2013.01) | |
| *G06F 3/04847* | (2022.01) | |
| *G06F 3/147* | (2006.01) | |
| *G06F 8/41* | (2018.01) | |
| *G06F 8/51* | (2018.01) | |
| *G06F 8/53* | (2018.01) | |
| *G06F 8/74* | (2018.01) | |
| *G06F 9/4401* | (2018.01) | |
| *G06F 30/12* | (2020.01) | |
| *G06F 30/13* | (2020.01) | |
| *G06F 30/18* | (2020.01) | |
| *G06Q 30/0283* | (2023.01) | |
| *H02J 3/00* | (2006.01) | |
| *H04B 3/46* | (2015.01) | |
| *H04L 43/50* | (2022.01) | |
| *H04L 67/12* | (2022.01) | |
| *H04L 67/125* | (2022.01) | |
| *H04L 67/75* | (2022.01) | |
| *H04M 3/30* | (2006.01) | |
| *H04W 4/80* | (2018.01) | |
| *H04W 84/00* | (2009.01) | |
| *H05K 7/14* | (2006.01) | |
| *G06F 30/392* | (2020.01) | |
| *G06F 111/04* | (2020.01) | |
| *G06F 111/16* | (2020.01) | |
| *G06F 113/04* | (2020.01) | |
| *G06F 113/16* | (2020.01) | |
| *G06F 115/12* | (2020.01) | |

(52) U.S. Cl.
CPC ............. *F24F 11/88* (2018.01); *G01R 31/55* (2020.01); *G05B 13/0265* (2013.01); *G05B 15/02* (2013.01); *G05B 19/048* (2013.01); *G05B 23/0216* (2013.01); *G05B 23/0264* (2013.01); *G05B 23/0272* (2013.01); *G06F 1/3209* (2013.01); *G06F 1/3246* (2013.01); *G06F 3/04186* (2019.05); *G06F 3/0482* (2013.01); *G06F 3/04847* (2013.01); *G06F 3/147* (2013.01); *G06F 8/436* (2013.01); *G06F 8/51* (2013.01); *G06F 8/53* (2013.01); *G06F 8/74* (2013.01); *G06F 9/4418* (2013.01); *G06F 30/12* (2020.01); *G06F 30/13* (2020.01); *G06F 30/18* (2020.01); *G06Q 30/0283* (2013.01); *H02J 3/00* (2013.01); *H04B 3/46* (2013.01); *H04L 43/50* (2013.01); *H04L 67/12* (2013.01); *H04L 67/125* (2013.01); *H04L 67/75* (2022.05); *H04M 3/305* (2013.01); *H04W 4/80* (2018.02); *H04W 84/00* (2013.01); *H05K 7/1468* (2013.01); *H05K 7/1477* (2013.01); *H05K 7/1481* (2013.01); *G06F 30/392* (2020.01); *G06F 2111/04* (2020.01); *G06F 2111/16* (2020.01); *G06F 2113/04* (2020.01); *G06F 2113/16* (2020.01); *G06F 2115/12* (2020.01); *H02J 2310/12* (2020.01)

(58) Field of Classification Search
USPC .......................................................... 236/3
See application file for complete search history.

(56) References Cited

U.S. PATENT DOCUMENTS

| | | |
|---|---|---|
| 5,530,643 A | 6/1996 | Hodorowski |
| 5,787,133 A | 7/1998 | Marchetto et al. |
| 6,275,962 B1 | 8/2001 | Fuller et al. |
| 6,301,341 B1 | 10/2001 | Gizara et al. |
| 6,349,235 B1 | 2/2002 | Gibart et al. |
| 6,437,692 B1 | 8/2002 | Petite et al. |
| 6,606,731 B1 | 8/2003 | Baum et al. |
| 6,645,066 B2 | 11/2003 | Gutta et al. |
| 6,813,777 B1 | 11/2004 | Weinberger et al. |
| 6,891,838 B1 | 5/2005 | Petite et al. |
| 7,102,502 B2 | 9/2006 | Autret |
| 7,304,855 B1 | 12/2007 | Milligan et al. |
| 7,578,135 B2 | 8/2009 | Mattheis |
| 7,587,250 B2 | 9/2009 | Coogan et al. |
| 7,729,882 B2 | 6/2010 | Seem |
| 7,734,572 B2 | 6/2010 | Wiemeyer et al. |
| 7,835,431 B2 | 11/2010 | Belge |
| 7,865,629 B1 | 1/2011 | Tantos et al. |
| 7,917,232 B2 | 3/2011 | McCoy et al. |
| 8,024,054 B2 | 9/2011 | Mairs et al. |
| 8,099,178 B2 | 1/2012 | Mairs et al. |
| 8,503,183 B2 | 8/2013 | Hamilton et al. |
| 8,503,943 B2 | 8/2013 | Spanhake |
| 8,628,239 B2 | 1/2014 | Merrow et al. |
| 8,643,476 B2 | 2/2014 | Pinn et al. |
| 8,749,959 B2 | 6/2014 | Riley et al. |
| 8,782,619 B2 | 7/2014 | Wu et al. |
| 8,925,358 B2 | 1/2015 | Kasper |
| 9,441,847 B2 | 9/2016 | Grohman |
| 9,521,724 B1 | 12/2016 | Berry et al. |
| 9,544,209 B2 | 1/2017 | Gielarowski et al. |
| 9,602,301 B2 | 3/2017 | Averitt |
| 9,664,400 B2 | 5/2017 | Wroblewski et al. |
| 9,678,494 B2 | 6/2017 | Hyde et al. |
| 9,740,385 B2 | 8/2017 | Fadell et al. |
| 9,791,872 B2 | 10/2017 | Wang et al. |
| 9,843,229 B2 | 12/2017 | Leabman |
| 9,857,238 B2 | 1/2018 | Malhotra et al. |
| 9,860,961 B2 | 1/2018 | Chemel et al. |
| 9,952,573 B2 | 4/2018 | Sloo et al. |
| 10,042,730 B2 | 8/2018 | Zebian |
| 10,094,586 B2 | 10/2018 | Pavlovski et al. |
| 10,135,295 B2 | 11/2018 | Leabman |
| 10,223,721 B1 | 3/2019 | Bhatia |
| 10,333,305 B2 | 6/2019 | Imai et al. |
| 10,334,758 B1 | 6/2019 | Ramirez et al. |
| 10,512,143 B1 | 12/2019 | Ikehara et al. |
| 10,515,177 B1 | 12/2019 | Ruehl et al. |
| 10,528,016 B2 | 1/2020 | Noboa |
| 10,557,889 B2 | 2/2020 | Montoya et al. |
| 10,558,183 B2 | 2/2020 | Piaskowski et al. |
| 10,558,248 B2 | 2/2020 | Adrian |
| 10,627,124 B2 | 4/2020 | Walser et al. |
| 10,640,211 B2 | 5/2020 | Whitten et al. |
| 10,650,336 B2 | 5/2020 | Kopp |
| 10,672,293 B2 | 6/2020 | Labutov et al. |
| 10,687,435 B2 | 6/2020 | Adrian et al. |
| 10,736,228 B2 | 8/2020 | Kho et al. |
| 10,775,824 B2 | 9/2020 | Main et al. |
| 10,892,946 B2 | 1/2021 | Correia e Costa et al. |
| 10,900,489 B2 | 1/2021 | Rendusara et al. |
| 10,942,871 B2 | 3/2021 | Cawse et al. |
| 10,943,444 B2 | 3/2021 | Boyd et al. |
| 10,966,068 B2 | 3/2021 | Tramiel et al. |
| 10,966,342 B2 | 3/2021 | Lairsey et al. |
| 10,969,133 B2 | 4/2021 | Harvey |
| 11,088,989 B2 | 8/2021 | Gao et al. |
| 11,229,138 B1 | 1/2022 | Harvey et al. |

(56) References Cited

U.S. PATENT DOCUMENTS

| | | |
|---|---|---|
| 11,294,254 B2 | 4/2022 | Patterson et al. |
| 2004/0236547 A1 | 11/2004 | Rappaport et al. |
| 2005/0040247 A1 | 2/2005 | Pouchak |
| 2006/0103545 A1 | 5/2006 | Tsou |
| 2007/0096902 A1 | 5/2007 | Seeley et al. |
| 2007/0162288 A1 | 7/2007 | Springhart et al. |
| 2008/0222584 A1 | 9/2008 | Habib et al. |
| 2008/0270951 A1 | 10/2008 | Anand et al. |
| 2008/0277486 A1 | 11/2008 | Seem et al. |
| 2009/0189764 A1 | 7/2009 | Keller et al. |
| 2009/0217063 A1 | 8/2009 | Tomita |
| 2010/0005218 A1 | 1/2010 | Gower et al. |
| 2010/0025483 A1 | 2/2010 | Hoeynck et al. |
| 2010/0131933 A1 | 5/2010 | Kim et al. |
| 2010/0162037 A1 | 6/2010 | Maule et al. |
| 2010/0237891 A1 | 9/2010 | Lin et al. |
| 2011/0087988 A1 | 4/2011 | Ray et al. |
| 2011/0125930 A1 | 5/2011 | Tantos et al. |
| 2012/0102472 A1 | 4/2012 | Wu et al. |
| 2012/0221986 A1 | 8/2012 | Whitford et al. |
| 2013/0343207 A1 | 12/2013 | Cook et al. |
| 2013/0343388 A1 | 12/2013 | Stroud et al. |
| 2013/0343389 A1 | 12/2013 | Stroud et al. |
| 2013/0343390 A1 | 12/2013 | Moriarty et al. |
| 2013/0346987 A1 | 12/2013 | Raney et al. |
| 2014/0088772 A1 | 3/2014 | Lelkens |
| 2014/0101082 A1 | 4/2014 | Matsuoka et al. |
| 2014/0215446 A1 | 7/2014 | Araya et al. |
| 2014/0215450 A1* | 7/2014 | Salisbury ............. G06F 8/60 717/172 |
| 2014/0277757 A1 | 9/2014 | Wang et al. |
| 2014/0280960 A1 | 9/2014 | Paramasivam et al. |
| 2014/0358291 A1 | 12/2014 | Wells |
| 2014/0364985 A1 | 12/2014 | Tiwari et al. |
| 2015/0081928 A1 | 3/2015 | Wintzell et al. |
| 2015/0198938 A1 | 7/2015 | Steele et al. |
| 2015/0234381 A1 | 8/2015 | Ratilla et al. |
| 2016/0016454 A1 | 1/2016 | Yang et al. |
| 2016/0062753 A1 | 3/2016 | Champagne |
| 2016/0073521 A1 | 3/2016 | Marcade et al. |
| 2016/0086242 A1 | 3/2016 | Schafer et al. |
| 2016/0092427 A1 | 3/2016 | Bittmann |
| 2016/0132308 A1 | 5/2016 | Muldoon |
| 2016/0195856 A1 | 7/2016 | Spero |
| 2016/0205784 A1 | 7/2016 | Kyle et al. |
| 2016/0209868 A1 | 7/2016 | Hartman et al. |
| 2016/0248251 A1 | 8/2016 | Tinnakornsrisuphap et al. |
| 2016/0285715 A1 | 9/2016 | Gielarowski et al. |
| 2016/0295663 A1 | 10/2016 | Hyde et al. |
| 2016/0088438 A1 | 12/2016 | O'Keeffe |
| 2017/0075323 A1 | 3/2017 | Shrivastava et al. |
| 2017/0097259 A1 | 4/2017 | Brown et al. |
| 2017/0131611 A1 | 5/2017 | Brown et al. |
| 2017/0149638 A1 | 5/2017 | Gielarowski et al. |
| 2017/0169075 A1 | 6/2017 | Jiang et al. |
| 2017/0176034 A1 | 6/2017 | Hussain et al. |
| 2017/0217390 A1 | 8/2017 | Curtis et al. |
| 2017/0322579 A1 | 11/2017 | Goparaju et al. |
| 2017/0342920 A1 | 11/2017 | Pirjaberi et al. |
| 2017/0365908 A1 | 12/2017 | Hughes et al. |
| 2018/0005195 A1 | 1/2018 | Jacobson |
| 2018/0075168 A1 | 3/2018 | Tiwari et al. |
| 2018/0089172 A1 | 3/2018 | Needham |
| 2018/0123272 A1 | 5/2018 | Mundt et al. |
| 2018/0202678 A1 | 7/2018 | Ahuja et al. |
| 2018/0262573 A1 | 9/2018 | Przybylski et al. |
| 2018/0266716 A1 | 9/2018 | Bender et al. |
| 2018/0307781 A1 | 10/2018 | Byers et al. |
| 2019/0087076 A1 | 4/2019 | Dey et al. |
| 2019/0138704 A1 | 5/2019 | Shrivastava et al. |
| 2019/0146429 A1 | 5/2019 | Nayak et al. |
| 2019/0156443 A1 | 5/2019 | Idle |
| 2019/0173109 A1 | 6/2019 | Wang |
| 2019/0278442 A1 | 9/2019 | Liang |
| 2019/0294018 A1 | 9/2019 | Shrivastava et al. |
| 2020/0003444 A1 | 1/2020 | Yuan et al. |
| 2020/0018506 A1 | 1/2020 | Ruiz et al. |
| 2020/0050161 A1 | 2/2020 | Noboa |
| 2020/0133257 A1 | 4/2020 | Cella et al. |
| 2020/0150508 A1 | 5/2020 | Patterson et al. |
| 2020/0167442 A1 | 5/2020 | Roecker et al. |
| 2020/0187147 A1 | 6/2020 | Meerbeek et al. |
| 2020/0221269 A1 | 7/2020 | Tramiel et al. |
| 2020/0226223 A1 | 7/2020 | Reichl |
| 2020/0228759 A1 | 7/2020 | Ryan et al. |
| 2020/0255142 A1 | 8/2020 | Whitten et al. |
| 2020/0279482 A1 | 9/2020 | Berry et al. |
| 2020/0284883 A1 | 9/2020 | Ferreira et al. |
| 2020/0287786 A1 | 9/2020 | Anderson et al. |
| 2020/0288558 A1 | 9/2020 | Anderson et al. |
| 2020/0342526 A1 | 10/2020 | Ablanczy |
| 2020/0379730 A1 | 12/2020 | Graham et al. |
| 2020/0387041 A1 | 12/2020 | Shrivastava et al. |
| 2020/0387129 A1 | 12/2020 | Chandaria |
| 2021/0073441 A1 | 3/2021 | Austern et al. |
| 2021/0081504 A1 | 3/2021 | Mccormick et al. |
| 2021/0081880 A1 | 3/2021 | Bivins et al. |
| 2021/0003830 A1 | 4/2021 | Harvey |
| 2021/0157312 A1 | 5/2021 | Cella et al. |
| 2021/0182660 A1 | 6/2021 | Amirguliyev et al. |
| 2021/0366793 A1 | 11/2021 | Hung et al. |
| 2021/0383041 A1 | 12/2021 | Harvey et al. |
| 2021/0400787 A1 | 12/2021 | Abbo et al. |
| 2022/0066722 A1 | 3/2022 | Harvey et al. |
| 2022/0069863 A1 | 3/2022 | Harvey |
| 2022/0070293 A1 | 3/2022 | Harvey et al. |

FOREIGN PATENT DOCUMENTS

| | | |
|---|---|---|
| CN | 206489622 U | 9/2017 |
| JP | 6301341 B2 | 3/2018 |
| TW | 200420980 A * | 10/2004 |
| WO | 2008016500 A3 | 3/2008 |
| WO | WO2012019328 A1 | 2/2012 |
| WO | 2014025511 A1 | 2/2014 |

OTHER PUBLICATIONS

Hagentoft et al. Full Reference, Assessment Method of Numerical Prediction Models for Combined Heat, Air and Moisture Transfer in Building Components: Benchmarks for One-dimensional Cases, Journal of Thermal Env. & Bldg. Sci., vol. 27, No. 4, Apr. 2004.

U.S. Appl. No. 15/995,019 Office Action mailed Jul. 26, 2019.

U.S. Appl. No. 15/995,019 Office Action mailed Oct. 8, 2020.

U.S. Appl. No. 15/995,019 Office Action mailed Apr. 15, 2020.

De Meester et al., SERIF:A Semantic Exercise Interchange FormatConference: Proceedings of the 1st International Workshop on LINKed EDucation, Oct. 2015.

Kalagnanam et al., "A System for Automated Mapping of Bill-of_Materials Part Numbers", KDD '04: Proceedings of the tenth ACM SIGKDD international conference on Knowledge discovery and data mining, Aug. 2004, pp. 805-810.

Mouser Electronics News Release, Aug. 16, 2018.

Ouf et al., Effectiveness of using WiFi technologies to detect and predict building occupancy, Sust. Buildi. 2, 7 (2017).

Radiomaze, Inc., "WiFi signals enable motion recognition throughout the entire home," Dec. 4, 2017.

Sensorswarm, 2018.

Siano, P, "Demand response and smart grids—A survey", Renewable and Sustainable Energy Reviews 30 (2014) 461-478.

Wang et al., "A Practical Multi-Sensor Cooling Demand Estimation Approach Based on Visual Indoor and Outdoor Information Sensing," Sensors 2018, 18, 3591; doi: 10.3390.

Yegulap, Serdar, "What is LLVM? The power behind Swift, Rust, Clang, and more," Infoworld, Mar. 11, 2020.

Serale G., et al., Model Predictive Control (MPC) for Enhancing Building and HVAC System Energy Efficiency: Problem Formulation, Applications and Opportunities, Energies 2018, 11, 631; doi: 10.3390, Mar. 12, 2018.

(56) References Cited

OTHER PUBLICATIONS

Amin, Massoud, "Toward self-healing energy infrastructure systems," IEEE Computer Applications in Power 14.1 (2002): pp. 20-28.
Gou, Wenqi, and Mengchu Zhou, "An emerging technology for improved building automation control," 2009, IEEE International Conference on Systems, Man and Cybernetics, IEEE, 2009, pp. 337-342.
Gungor et al., "Industrial Wireless Sensor Networks: Challenges, Design Principles, and Technical Approaches," IEEE Transactions on Industrial Electronics, vol. 56, No. 10, Oct. 2009.
Gou, Wendy et al., "Wireless mesh networks in intelligent building automation control: a survey." International Journal of Intelligent Control and Systems, vol. 16, No. 1, Mar. 2011, 28-36.
Kastner, Wolfgang, et al., "Building Automation System Integration into the Internet of Things, the IoT6 Approach, Its Realization and Validation," Proceedings of the 2014 IEEE Emerging Technology and Factory Automation (ETFA), IEEE, 2014, pp. 1-9 (Year:2014).
Shailendra, Eshan et al., "Analyzing home automation and networking technologies," IEEE Potentials 37.1 (2018): pp. 27-33, (Year: 2018).

\* cited by examiner

CONTROLLER WITH MOVEABLE INTERACTIVE SCREEN

RELATED APPLICATION

The present application hereby incorporates by reference the entirety of, and claims priority to, U.S. Provisional Patent Application Ser. No. 63/070,460 filed 26 Aug. 2020.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present disclosure relates to electrical control boxes; more specifically, an electrical control box with a sliding screen.

SUMMARY

This summary is provided to introduce a selection of concepts in a simplified form that are further described below in the Detailed Description section. This summary does not identify required or essential features of the claimed subject matter. The innovation is defined with claims, and to the extent this Summary conflicts with the claims, the claims should prevail.

Embodiments disclosed herein provide systems and methods for controllers with sliding screens.

In embodiments, a building system controller is disclosed, that comprises: a housing adapted to store a plurality of modules, the housing with computing hardware and programmable memory attached; the housing having a front surface comprising a moveable interactive display moveably connected to the housing; the housing having a controller connector attached to an inside surface, the controller connector providing a connection point for an external resource; the housing adapted for setup or maintenance of the controller connector when the moveable interactive display is in an open position; and the moveable interactive display adapted for setup or maintenance of controller interaction with the external resource when the moveable interactive display is in a closed position.

In embodiments, a module with a module connector and a resource connector is disclosed, wherein the module connector is operationally able to connect the resource connector to wiring for the external resource.

In embodiments, the resource connector is operationally able to provide voltage monitoring.

In embodiments, the resource connector is operationally able to provide power monitoring.

In embodiments, the resource connector is operationally able to provide fault detection.

In embodiments, there are multiple controller connectors and wherein representations of the multiple controller connectors are displayed on the moveable interactive display.

In embodiments, the moveable interactive display is operationally able to allow a user to determine a protocol for the controller connector.

In embodiments, the moveable interactive display is operationally able to update when a new resource is attached to the controller connector.

In embodiments, the moveable interactive display is operationally able to move to display the controller connector and a screen associated with the moveable interactive display simultaneously.

In embodiments, a second controller is disclosed, and the building system controller is connected to the second controller.

In embodiments, mains power is disclosed, and the mains power is shut off when the moveable interactive display is in the open position.

In embodiments, a hook tab is disclosed that is operationally able to load a spring of a module operationally able to attach to the building system controller.

In embodiments, a spring bar is disclosed that is operationally able to load a spring of a module operationally able to attach to the building system controller.

In embodiments, a wiring terminal attachment block is disclosed that is operationally able to attach to a module with resource connectors that are operationally able to attach to a resource.

In embodiments, the mains power is shut off when the moveable interactive display is in the open position.

In embodiments, a housing adapted to store a plurality of modules is disclosed, the housing with computing hardware and programmable memory attached; the housing having a front surface comprising a moveable interactive display moveably connected to the housing, the moveable interactive display operationally able to display a controller setup and maintenance screen; the housing having a controller connector attached to an inside surface, the controller connector providing a connection point for a module, the module comprising a module connector and a resource connector; and the housing adapted for maintenance of the resource connector when the moveable interactive display is in the open position.

In embodiments, the moveable interactive display is adapted for viewing a controller setup when the moveable interactive display is in closed position.

In embodiments, the resource connector comprises current monitoring, voltage monitoring, power monitoring, or fault detection.

In embodiments, a building controller assembly is disclosed, comprising: a housing, a plurality of controller connectors attachments operably connected to the housing, the plurality of controller connectors supported by said housing; a processing circuit supported by said housing, the processing circuit programmed into at least one memory device to perform displaying, on a moveable interactive display associated with the housing, a resource associated with a controller connector; the memory also comprising resource installation information identifying resource input protocols for the controller connector, wherein the processing circuit operably receives at least one input value from at least one of the plurality of controller connectors and operably provides at least one output value based on the resource installation information.

In embodiments, the at least one output value is one of current is correct, voltage is correct, power is correct, or fault is not detected.

BRIEF DESCRIPTION OF THE FIGURES

Non-limiting and non-exhaustive embodiments of the present embodiments are described with reference to the following FIGURES, wherein like reference numerals refer to like parts throughout the various views unless otherwise specified.

Figure 1:
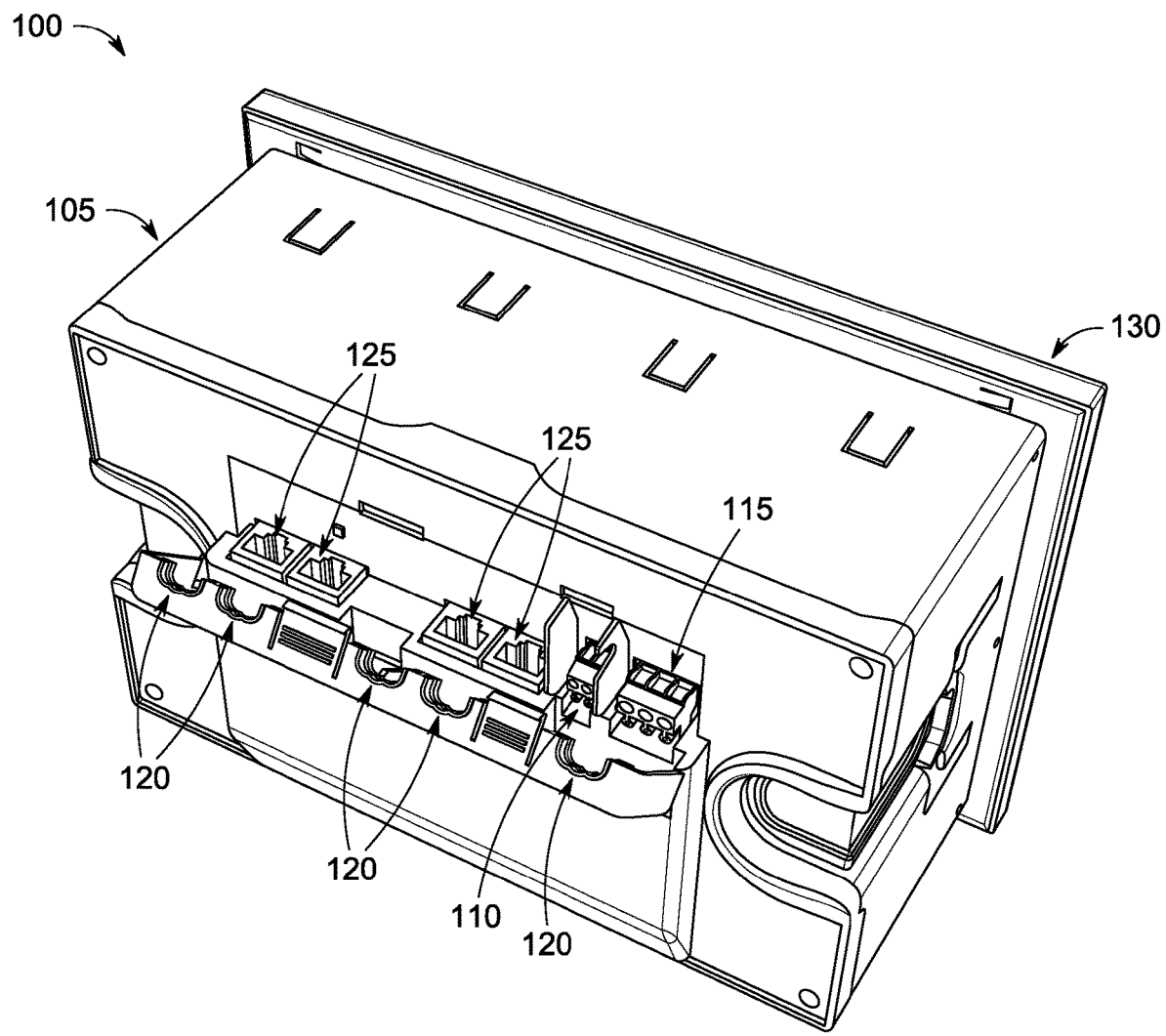
FIG. 1 is a rear perspective view of the controller embodiment with a sliding screen.

Corresponding reference characters indicate corresponding components throughout the several views of the drawings. Skilled artisans will appreciate that elements in the FIGURES are illustrated for simplicity and clarity and have not necessarily been drawn to scale. For example, the dimensions of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments.

DETAILED DESCRIPTION

Disclosed below are representative embodiments of methods, computer-readable media, and systems having particular applicability to modules used in electrical controllers. In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments. "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). "Program" is used broadly herein, to include applications, kernels, drivers, interrupt handlers, firmware, state machines, libraries, and other code written by programmers (who are also referred to as developers) and/or automatically generated.

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

The technical character of embodiments described herein will be apparent to one of ordinary skill in the art, and will also be apparent in several ways to a wide range of attentive readers. Some embodiments address technical activities that are rooted in computing technology, such as providing a module interface to more easily correlate devices and the controllers that they will be wired to. This allows easy changes to controllers during the construction process, as equipment is often moved around, controllers are moved, etc., without requiring days or weeks of effort to determine if the correct wire is connected to the correct controller wiring location. Buildings can also be constructed more efficiently as benefits that are not apparent until the construction process can be implemented with little down-time, as equipment with different wiring requirements can be newly installed in a controller by changing modules. Further, as a building or other physical space can build its controller wiring diagram completely within a single controller (or multiple controllers networked only to each other) the entire system has a level of security unable to be reached with systems that are connected to the greater internet. In a multiple controller system, the different controllers may be self-federating, such that they can choose a master controller, can choose a different master controller if the original master has problems, can chunk computer programs to run on multiple controllers, etc. Other advantages based on the technical characteristics of the teachings will also be apparent to one of skill from the description provided.

I. Overview

A building controller is an interface between equipment associated with a defined space and sensors that monitor the building state. In some embodiments, it may replace building control panels in whole or in part. In an illustrative example, a controller 100 is shown that may be used with any of the disclosed embodiments. The controller 100 comprises a housing 105 with a moveable display screen 130. When the moveable screen is opened, the wiring of the controller 115 is displayed allowing installation, real-time wiring feedback, live testing, and protocol changes on the fly. Using these embodiments may reduce install time by half, and project time significantly. When the screen 130 is shut, the controller wiring can no longer be seen. However, the display screen can still be used to view the contents of the controller and details about resources connected to the controller, and change the devices, the protocols of the device, the specific wiring of a device, etc. The resources may comprise devices of many types, such as sensors or equipment. Different modules connect with a different mix of hardware, and provide a different mix of interfaces, although there may be overlap.

In an embodiment, the controller is an interface between equipment associated with the building and sensors that monitor the building state. In some embodiments, it may replace building control panels in whole or in part. In an illustrative example, the controller comprises a housing with a moveable screen; the moveable screen may be a sliding screen. When the moveable screen is opened, the modules of the controller that are wired to various resources in the building are displayed. When the screen is shut, the controller can be used to view building diagrams, resource allocation, etc. Unlock the screen and slide out of the way, and the controller may transform into an installer control center. Real-time wiring feedback, live testing, protocol changes may be made on the fly.

The controller may combine your automation needs into one pre-manufactured control panel—wiring modules, setup interface, user access point, power supply and bussing. This may reduce install time by half, and project time by as much as 90%. The screen may be able to be locked and unlocked. When the unlocked screen is moved out of the way of the housing, the controller can transform into an installer control center. Real-time wiring feedback, live testing, and protocol changes on the fly, to name a few functions, may be easily be performed. The controller may have a housing that can be embedded in a wall just deep enough so that the screen is free to move outside the wall, such that the contents of the controller can be displayed when the screen is opened.

II. Systems

FIG. 1 discloses the back housing 105 of a controller embodiment 100 with a sliding screen 130. Four ethernet magjacks 125 allow the controller to connect to Ethernet/IP based sensors and control systems. Embodiments with more or fewer magjacks are envisioned. A screw terminal connector 110 is disclosed. Certain areas (such as Chicago, Ill.), have historical codes prohibiting pulling line voltage wires without conduit, so this option is provided for a lower voltage input. Mains electricity (line power) 115 is positioned on the back in this embodiment, although other locations (as with everything else) are also envisioned. This line power embodiment 115 has a screw terminal connector. The power supply can be set up for 120 VAC, as is used in the US or 230 VAC, as used in Europe. Other power supply voltages can be set up as well, as can DC voltages. Grommet holes 120 (in this embodiment, rubber based) help with strain relief of ethernet and power cables.

Figure 2:
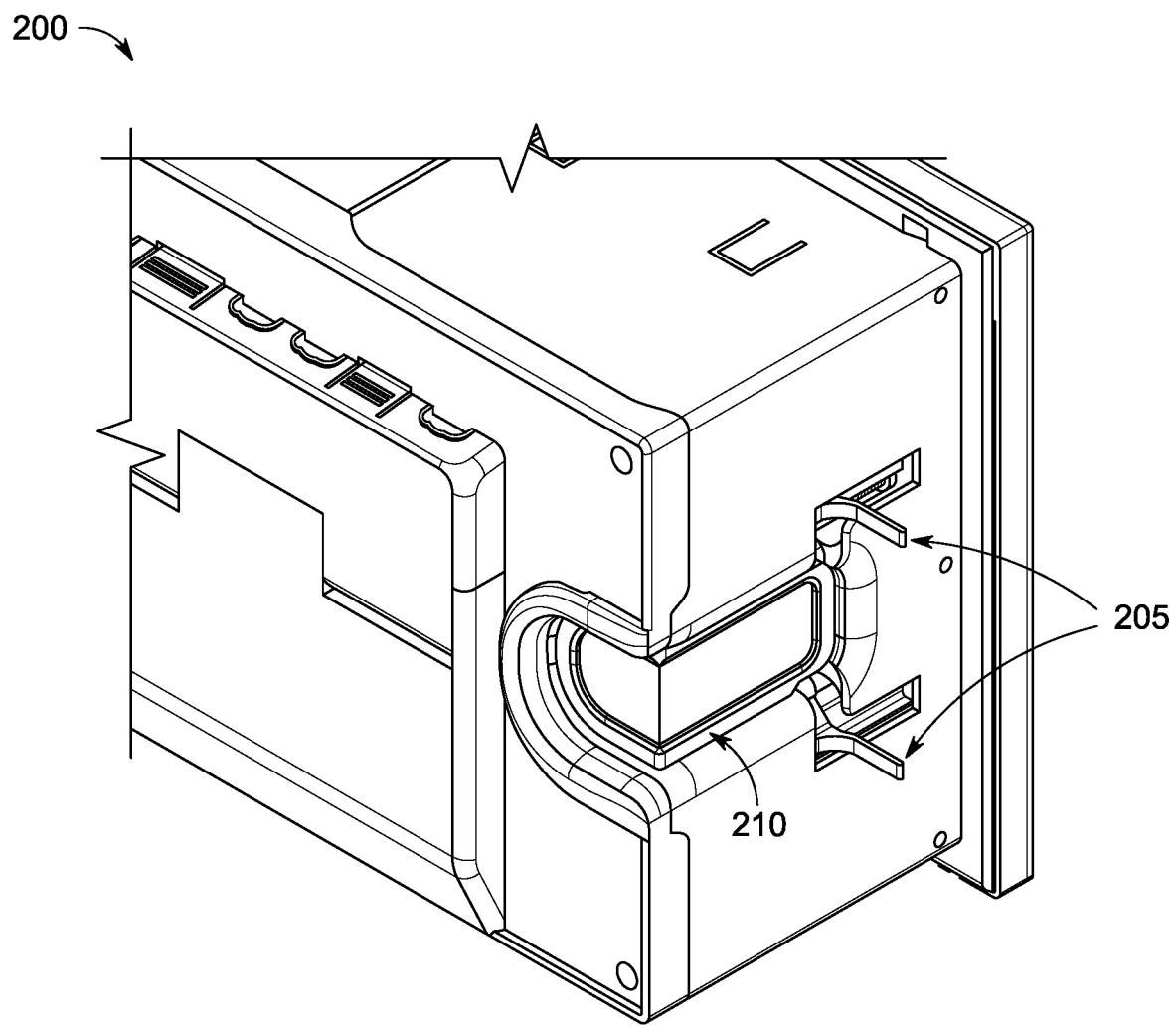
FIG. 2 is a rear right perspective view of the controller embodiment with a sliding screen.

FIG. 2 is a rear right perspective view 200 of the controller. A wall locking mechanism embodiment is disclosed. In this embodiment, screws turn cams (not pictured), which catch onto flanges 205, spin them onto threads and tighten the box into the wall cavity. A grommet can be seen at 210. This grommet 210, which may be made of rubber or another material, allow for easy pulling of wires from the wall into the controller, where they can be routed to relevant I/O modules.

Figure 3:
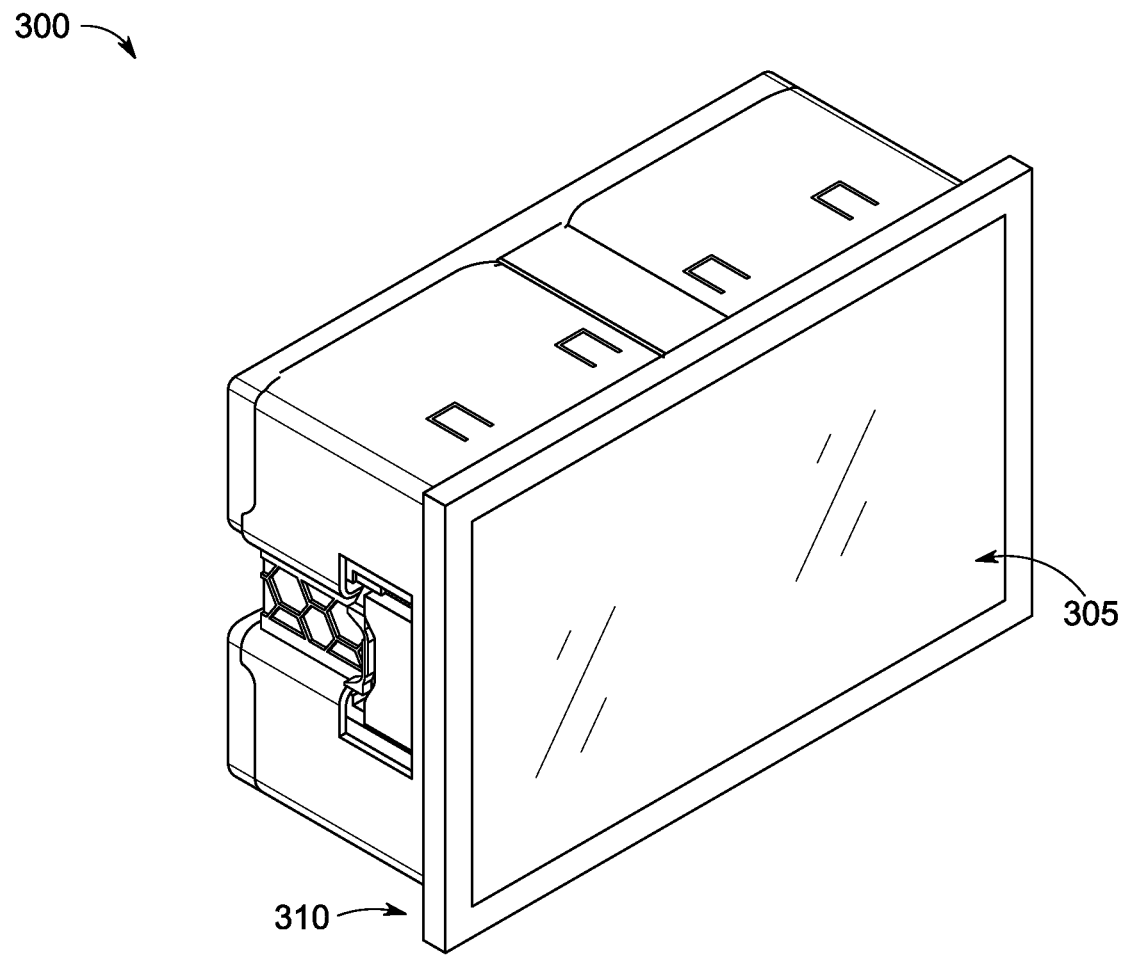
FIG. 3 is a front left perspective view of the controller embodiment with a sliding screen.

FIG. 3 is a left perspective view 300 of the controller. A moveable interactive display situated as the front surface of a controller box is shown in the closed position 305. A flange 310 allows the controller to be inset into a wall such that users will see the screen and the face frame.

Figure 4:
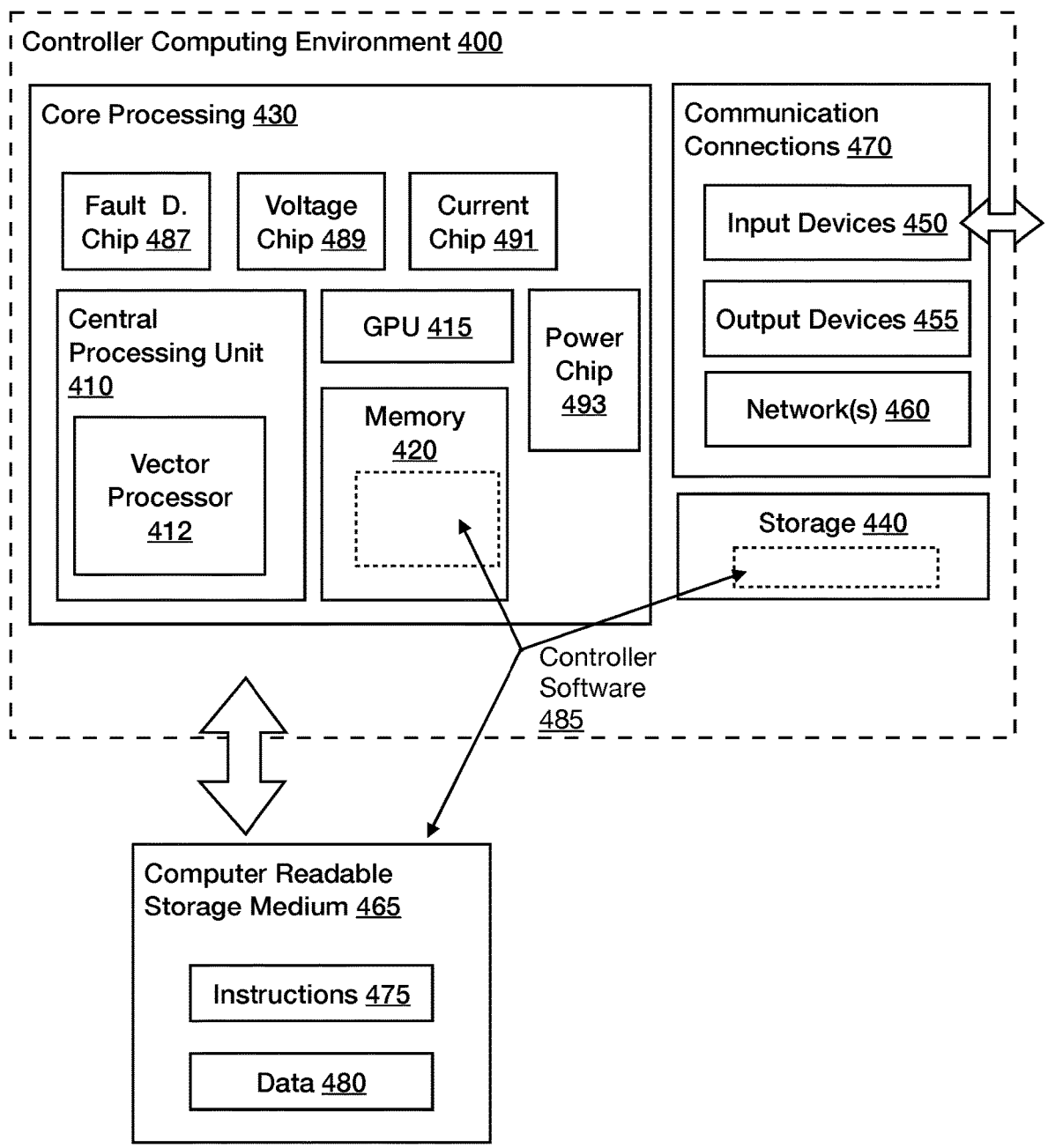
FIG. 4 illustrates a computing environment which may be provided on a controller Motherboard.

FIG. 4 illustrates a computing environment 400 which may be provided on a controller Motherboard. Some of these items may be included in some embodiments. Some of these items may not be included in some embodiments. Core processing is indicated by the core processing 430 box, which comprises, at least, the computing hardware, eg., the central processing unit, GPU 415, and Programmable Memory 420. The controller computing environment 400 includes at least one central processing unit 410 and memory 420. The central processing unit 410 executes computer-executable instructions and may be a real or a virtual processor. It may also comprise a vector processor 412, which allows same-length neuron strings to be processed rapidly. The controller may be a part of a multi-computing environment. In such a multi-processing environment, multiple processing units (which may be multiple controllers) execute computer-executable instructions to increase processing power and as such the vector processor 412, GPU 415, and CPU 410 can be running simultaneously. The memory 420 may be volatile memory (e.g., registers, cache, RAM), non-volatile memory (e.g., ROM, EEPROM, flash memory, etc.), or some combination of the two. The memory 420 stores software 485 which may implement methods, such as artificial intelligence methods, to determine display screens allowing users to determine controller setup and to determine if the correct resource wires have been connected to the correct controller connector or resource connector. The memory also stores software able to build a digital twin of the area that is controlled. This digital twin may comprise a building plan, details about the material makeup of the building such as types of materials the specific portions of the building will be made of, details about devices in the building, location of devices in the building, how the devices interact with each other, a controller interface that allows a user to set up devices to be attached to the controller, a controller interface that allows the controller to determine where the controllers should be placed within the building, and so forth.

A controller computing environment may have additional features. For example, the controller computing environment 400 includes storage 440, one or more input devices 450, one or more output devices 455, one or more network connections (e.g., wired, wireless, etc.) 460, as well as other communication connections 470. An interconnection mechanism (not shown) such as a bus, controller, or network interconnects the components of the computing environment 400. Typically, operating system software (not shown) provides an operating environment for other software executing in the controller computing environment 400, and coordinates activities of the components of the computing environment 400. The computing system may also be distributed; running portions of the software 485 on different CPUs.

The storage 440 stores instructions for the software 485 to implement controller artificial intelligence software.

The input device(s) 450 may be a device that allows a user or another device to communicate with the computing environment 400, such as a interactive device such as a keyboard, video camera, a microphone, mouse, pen, or trackball, and a scanning device, touchscreen, an LCD touchscreen, a moveable interactive device, and/or another device that provides input to the computing environment 400. The moveable interactive device may be a touchscreen that can slide up and down, back and forth, swivel from a corner, etc. For audio, the input device(s) 450 may be a sound card or similar device that accepts audio input in analog or digital form, or a CD-ROM reader that provides audio samples to the computing environment. The output device(s) 455 may be a display, printer, speaker, CD-writer, network connection that allows email, or another device that provides output from the controller computing environment 400.

The communication connection(s) 470 enable communication over a communication medium to another computing entity. The communication medium conveys information such as computer-executable instructions, compressed graphics information, or other data in a modulated data signal. Communication connections 470 may comprise input devices 450, output devices 455, and input/output devices that allows a client device to communicate with another device over network 460. A communication device may include one or more wireless transceivers for performing wireless communication and/or one or more communication ports for performing wired communication. These connections may include network connections, which may be a wired or wireless network such as the Internet, an intranet, a LAN, a WAN, a cellular network, spanning tree IP support, on-board bluetooth mesh, or another type of network. Network 460 may be a combination of multiple different kinds of wired or wireless networks. The network 460 may be a distributed network, with multiple computers, which might be building controllers acting in tandem. In some embodiments, distributed along the controllers may be an in-building computer cluster with connectivity to at least some of the other controllers in a building. This connectivity may be wired (such as Ethernet) or wireless. The controllers may be self-federating in that they self-assemble into a network. At startup (or a different time), controllers vote to elect a leader. If the network is damaged, such that the current leader can no longer lead, a new leader is elected by at least some of the undamaged controllers. This provides built-in redundancy. When a computer program is to be run to help with or to control building automation (or for another reason) the leader controller determines how to divide the work load among the controllers.

A communication connection 470 may be a portable communications device such as a wireless handheld device, a cell phone device, a room scanning device, and so on.

Computer-readable media 465—any available non-transient tangible media that can be accessed within a computing environment—may also be included. By way of example, and not limitation, with the controller computing environment 400, computer-readable media include memory 420, storage 440, communication media, and combinations of any of the above. Computer readable storage media 465 which may be used to store computer readable media comprises instructions 475 and data 480. Data Sources may be computing devices, such as general hardware platform servers configured to receive and transmit information over the communications connections 470. The controller computing environment 400 may be an electrical controller that is directly connected to various resources, such as HVAC resources, and which has CPU 410, a GPU 415, Memory 420, input devices 450, communication connections 470, and/or other features shown in the controller computing environment 400. The controller computing environment 400 may be a series of distributed computers. These distributed computers may comprise a series of connected electrical controllers. If the network is damaged, such that the current leader can no longer lead, a new leader is elected by at least some of the undamaged controllers. This provides built-in redundancy. When a computer program is to be run to help with or to control resource connection location with a controller (or for another reason) the leader controller determines how to divide the work load among the controllers.

The controller computing environment may also have specific-purpose chips, such as a fault detection chip 487 that detects if there is a fault on a wire, a voltage monitoring chip 489, a current monitoring chip 491, a power monitoring chip 493, etc.

Figure 5:
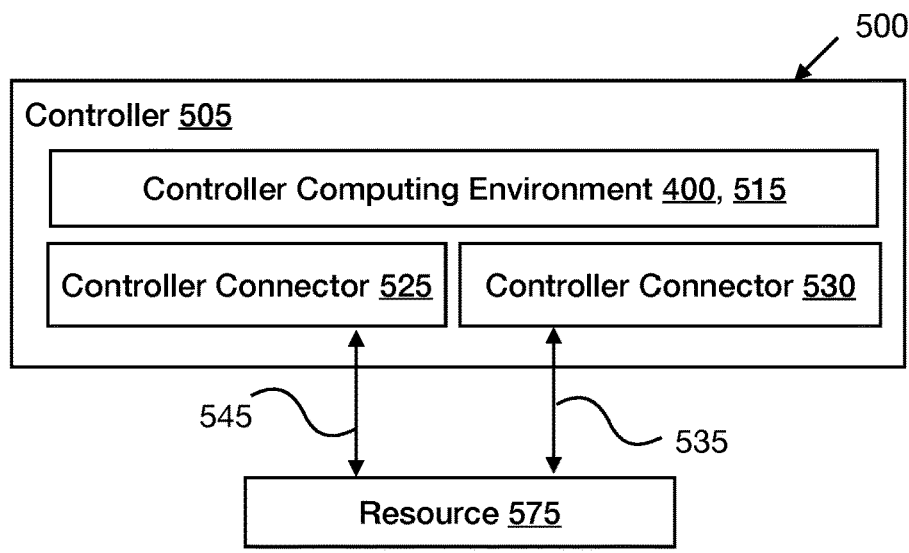
FIG. 5 illustrates a controller resource relationship.

FIG. 5 discloses a block diagram 500 of an exemplary controller-resource system. A controller 505 comprises a controller computing environment 400, 515. The controller 505 may also comprise one or more controller connectors 525, 530 that are connected through a resource wire 535 to a resource 575. This resource 575 may be any sort of resource, without limitation, that can be wired to a controller. For example, resources may be HVAC resources, such as heating, cooling, and storing resources, entertainment resources, such as sound systems and TV's, lighting resources, safety resources, such as door locks, etc. The controller 505 controls the resource 575 through the resource wires 535, through which the controller can send messages to the resource 575 and receive messages from the resource 575. Some resources, such as resource 575, have more than one resource wire 535, 545, passing and sending information to and from the controller 505. This allows the controller to control the resource, such as turning a resource on, or off, check if the resource is performing correctly, and so on. A controller 505 may also communicate with some resources wirelessly.

Figure 5A:
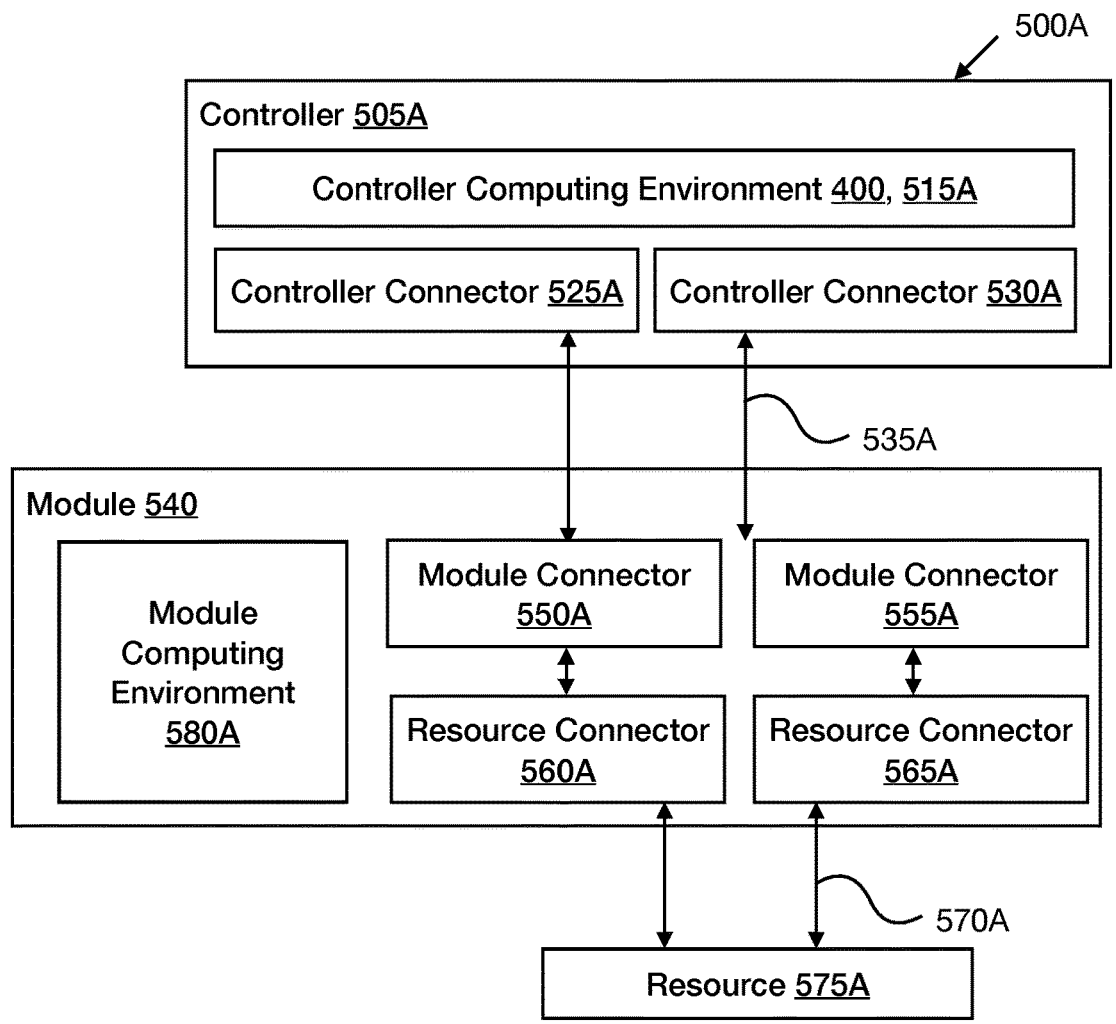
FIG. 5A illustrates a controller—module—resource relationship.

FIG. 5A discloses a block diagram 500A of an exemplary controller-resource system. In some embodiments, a controller computing environment 400, 515A is present. A module 540A sits between the controller connector 525A, 530A and the resource. A controller connector 525A, 530A is plugged into a module connector 550A, 555A. The module connector 550A, 555A is connected through a connection 535A, such as pogo pins, to a resource connector 560A, 565A. The resource connector 560A, 565A will then be wired through a resource wire 570A to a resource 575A. Information is passed from the controller 505A through the module 540A through the module connectors 550A, 555A. The information is then passed to the resource connectors 560A, 565A to the resource 575A, such as, telling a heater to turn on. The information moves in the other direction as well, from the resource 575A to a resource connector 560A to a module connector 550A, to a controller connector 525A, to the controller 505A. A resource may be wired 570A to one or more resource connectors 560A, 565A. In some embodiments, a resource may be wired to one or more modules. In certain embodiments, a controller may not control a specific resource at all, but infers its state from sensors, the state of other resources, and so forth.

In some embodiments, a module 540 comprises a module computing environment that may be able to make decisions at the module, and change the message that the controller connector 525A, 530A sends to the resource 575A. The Module computing environment may comprise a central processing unit, a memory, and chips that allow specific functions such as, e.g., fault detection, voltage monitoring, current, monitoring and power monitoring.

Figure 6:
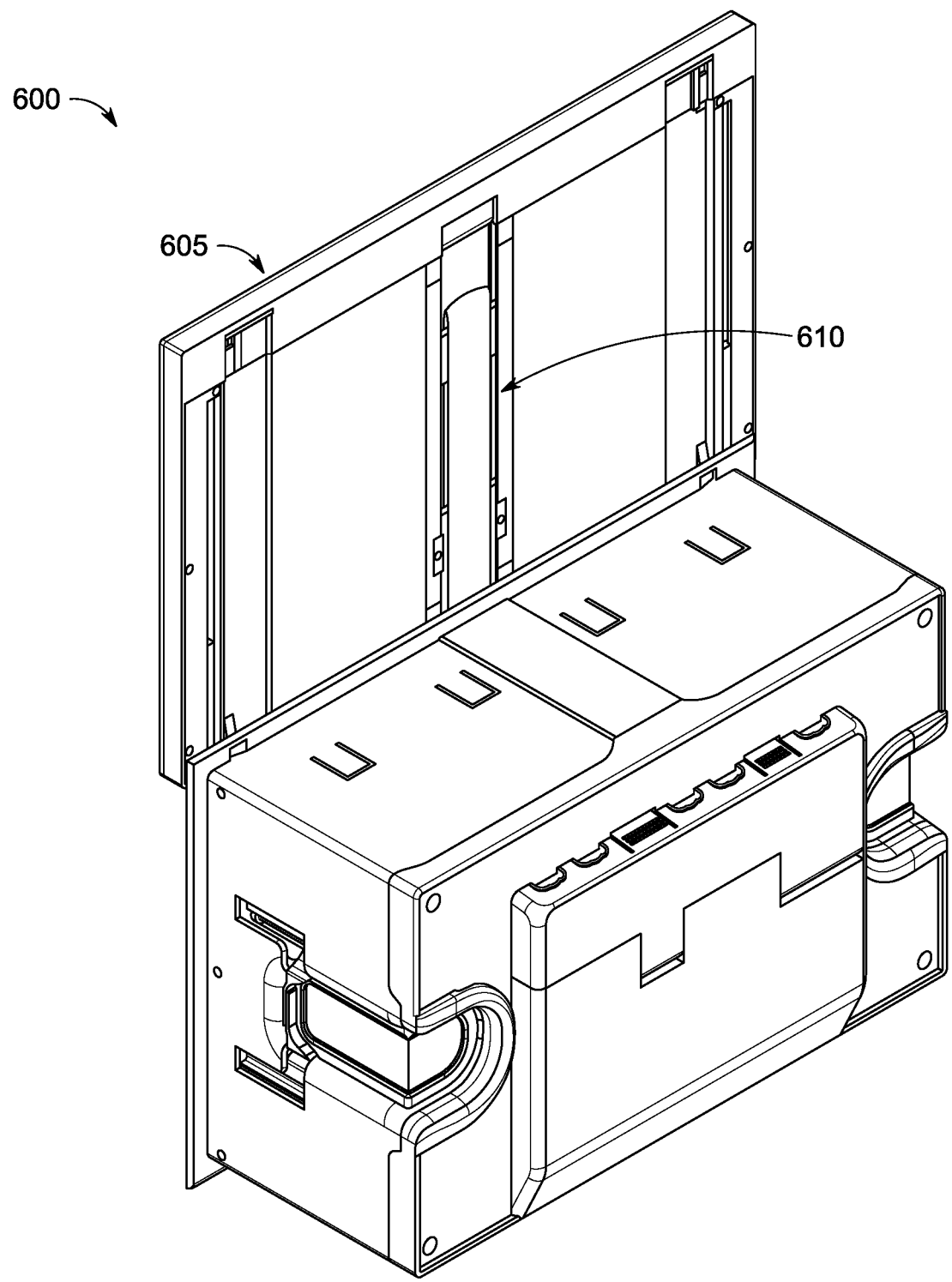
FIG. 6 is a rear view of the controller with the sliding screen raised.

FIG. 6 is a back left perspective view of the controller 600 with the moveable interactive display 605 in the open position. A cable tensioner mechanism 610 runs from the top of the interactive display down into the controller housing. A custom spring/tensioner solution that allows the display to retract/unfold when the screen is slid open and closed may be used. This is an adaption that allows for setup or maintenance of controller interaction with the external resource when the moveable interactive display is in the open position, by ensuring that the screen remains open. The controller wires to, and controls, external devices that will be used to change state in a physical structure associated with the controller. Examples of this include furnaces that warm the space, security systems that lock and unlock doors, humidifiers that change the humidity, etc.

Figure 7:
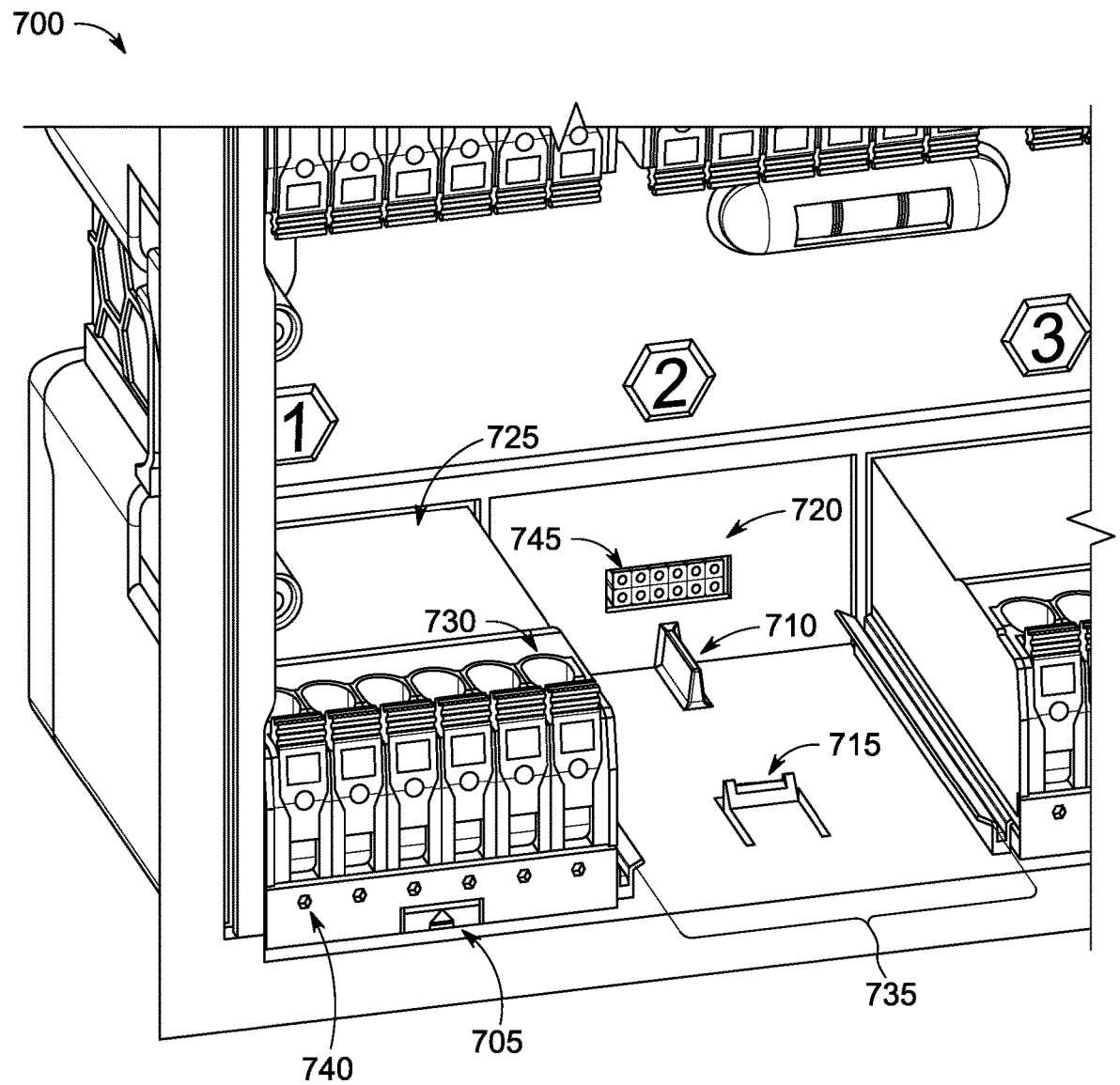
FIG. 7 is a view of the front left bottom controller housing with the moveable interactive screen in the up position.

FIG. 7 is a view of the front left bottom controller housing 700 with the moveable interactive screen in the up position, such that inside surfaces of the controller wiring box with a module 725 attached is displayed. In some embodiments, modules 725 that accepts wiring from an external resource can be plugged into the controller. These modules may allow different sorts of connections to the controller. A wiring terminal attachment block 720 (that may be composed of multiple terminal attachment pins 745, as shown here) is shown as an example of a controller connector 525A, 530A that is operationally able to connect to the module that an external resource can physically attach its wires to through a resource connector 730.

In an embodiment, when a module 725 is slid into a controller module bay 735, there are two springs in the module that become loaded; a front spring and a back spring. When the module slides in, the module catches on a hook tab 715, which loads the module front spring and a module ejector button 705. At this time, the back spring also becomes loaded by a spring bar 710. The spring bar 710 pushes the module spring as the module 725 is pushed into place. When the module ejector button 705 is pushed, it moves the hook tab 715 down. The force from the module back spring pushes the module 725 out of the module bay.

A module 725 may comprise resource connectors 730 that comprise one or more of: a universal port, a thermistor, a 0-10 V input/output, a 0-20 mA Input/Output, a 0-48 VAX input, a 24 VAC output. A module associated with a resource connector 730 may be operationally able to use a Modbus/RS485 interface. A module may comprise resource connectors 730 that themselves comprise zero or more 2× power control blocks, zero or more 120/240 VAX output—2 amps, zero or more 24 VAC output—2 amps, zero or more AC motor controls, and zero or more dimmable lighting connectors. Some module resource connectors, no matter what protocol is used, may have real-time current monitoring, real-time voltage monitoring, real-time fault detection, and/or real time power monitoring.

A module 725 may comprise resource connectors 730 that comprise one or more of: a 2× DC motor control block, a 12/24 VDC motor driver, a PWN speed control, real-time current monitoring, real-time voltage monitoring, overcurrent/torque protection, and tachometer feedback.

A module 725 may comprise resource connectors 730 that comprise one or more of: a 2× dry contact block, SPDT relays (10A), up to 240 VDC/VAC, real-time current monitoring, real-time voltage monitoring, and overcurrent protection.

One controller connector option—pogo pins 745—is shown, which operably connects the controller to a module. Other connectors can be used as well. In the illustrative embodiment, twelve pins are shown on the controller connector block 720, with twelve pins also on a matching module connector, but different numbers of pins can be used, without restriction. The number of resource connectors per module 725 can also be varied. They may be varied per module in a controller. For example, a controller may have some modules with two resource connectors and some modules with 5 resource connectors, etc. In the instant embodiment, there are six resource connectors per module.

A resource connector 730 and/or a wiring terminal attachment pin 745 may have one or more of built in voltage monitoring, built-in current monitoring, built-in power monitoring, and built-in fault-detection. These functions may be provided by chips in the controller computing environment 400, such as a fault detection chip 487, a voltage monitoring chip 489, a current monitoring chip 491, or a power monitoring chip 493. These functions may be provided in a module computing environment 580A. In some embodiments, these functions are provided by a module computing environment associated with a resource connector 730. These functions may be provided on the module using similar fault detection chips 487, voltage monitoring chips 489, current monitoring chips 491, and power monitoring chips 493. Some resource connectors 730 and/or wiring terminal attachment pins 745 may also provide overcurrent protection, dimmable lighting, AC motor control, 12/24 VDC motor drivers, PWM speed control, tachometer feedback, and/or SPDT relays (10A). A single wiring terminal attachment pin 745 or resource connector 730 may be able to accommodate one or more of a wide variety of protocols, such as BACNet, 24 VAC, 0-20 ma, 402-ma, 0-10 v, 2-10 v, RTD, and/or 1-wire.

Figure 8:
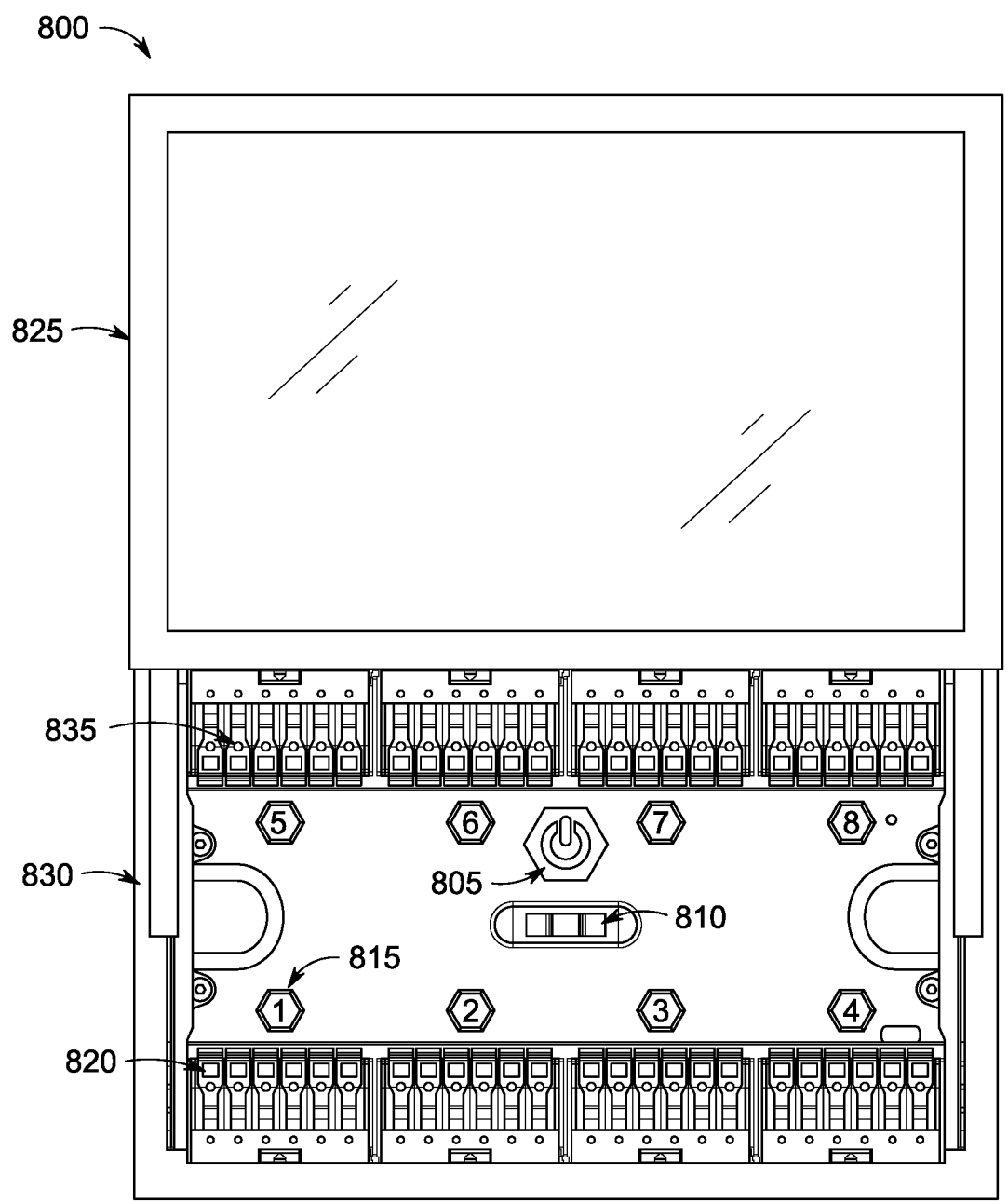
FIG. 8 is a front view of a controller box with the moveable interactive screen attached at the top in the up position.

FIG. 8 is a front view 800 of an opened controller box with the moveable interactive screen 825 attached at the top in the up position. In this embodiment, when the moveable interactive display is open, as shown here, the housing 830 (adapted to store a plurality of modules) is made accessible. The modules can be installed, setup and maintained here. The controller box may be able to be opened when it is embedded into a wall as shown with reference to FIG. 11 at 1100. In embodiments, a badge 805 in the controller lights up when the screen slides open to indicate that the controller is open and setting up device wiring can occur. The badge lighting will shut off when closed. Additionally, there may be a magnetic switch (not pictured) behind the screen, which alerts the controller to shut off mains power when the modules are being wired up; in some embodiments the mains power is shut off when the screen is open. Some embodiments include a bubble level 810. This built-in level can be used to assist installers in properly installing the controller. Separate module bays may be labeled with a number 815 or other marking.

Figure 8A:
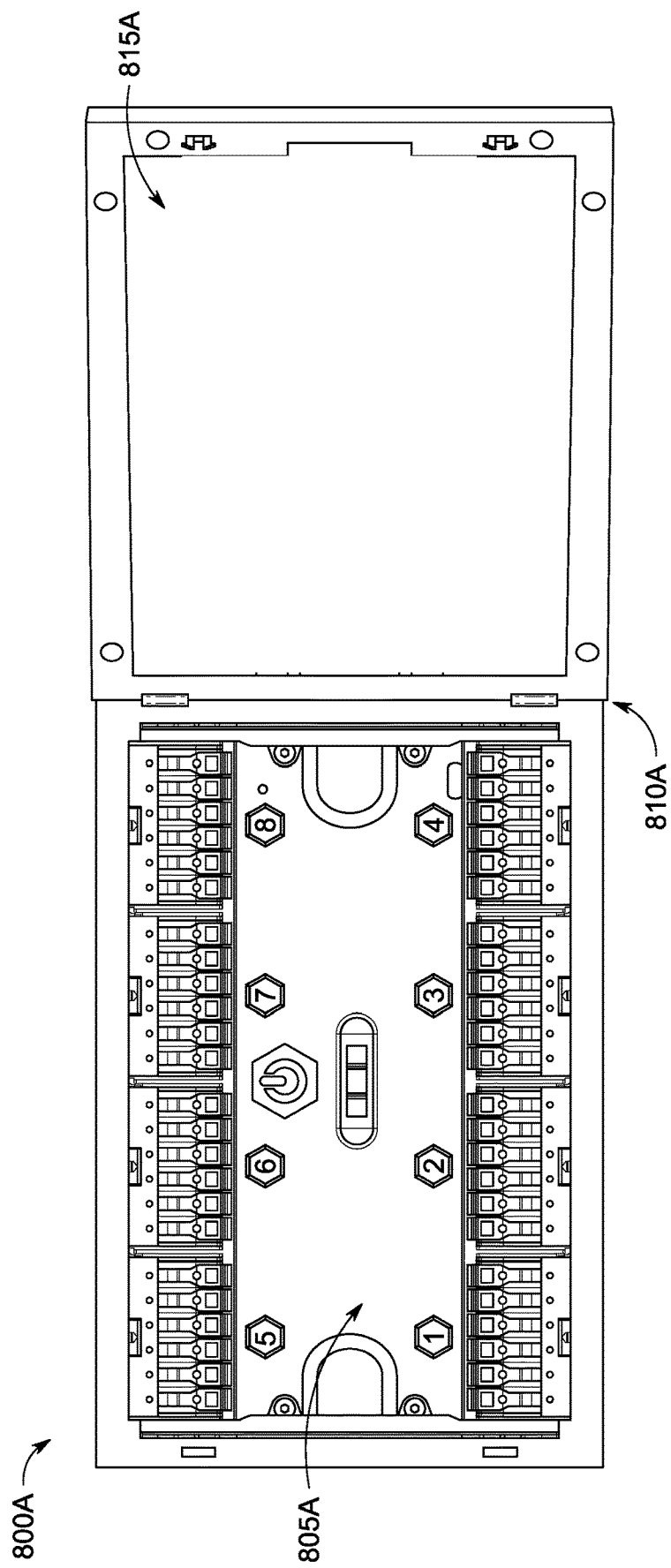
FIG. 8A is a front view of a controller box with the moveable interactive screen attached at the side in the up position.

FIG. 8A is a front view of the moveable interactive screen 800A attached at the side in the open position. The screen 815A, in this embodiment, is hinged 810A, and opens and closes like a book such that the display side will be seen when the screen is closed. In some implementations, the screen in oriented such that the display is visible when the screen is open. The hinge may be on either sides. In some embodiments, the screen slides from right to left or left to right to disclose the controller housing insides 805A. In such a situation, a sliding mechanism may be attached between the controller box 805A and the moveable interactive screen 815A at a side 810A of the controller.

Figure 8B:
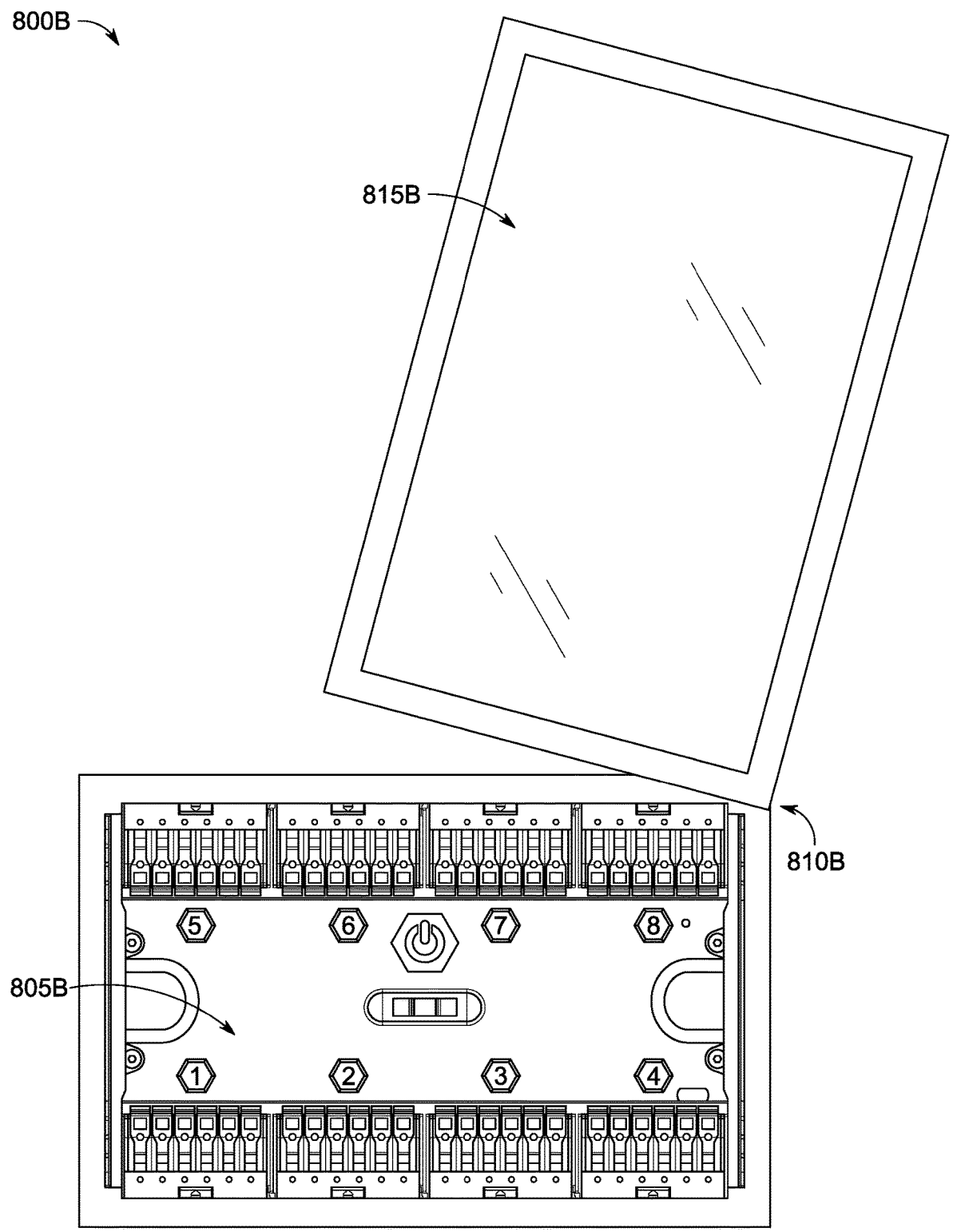
FIG. 8B is a front view of a controller box with the moveable interactive screen attached at a corner in the up position.

FIG. 8B is a front view of the moveable interactive screen 800B attached at a corner in the open position. The screen 815B, in this embodiment, pivots from a corner 810B to disclose the controller housing insides 805B. In such a situation, a pivot mechanism may be attached between the controller box 805B and the moveable interactive screen 815B at a corner 810B of the controller. Any of the four corners may be the connection point.

Figure 9:
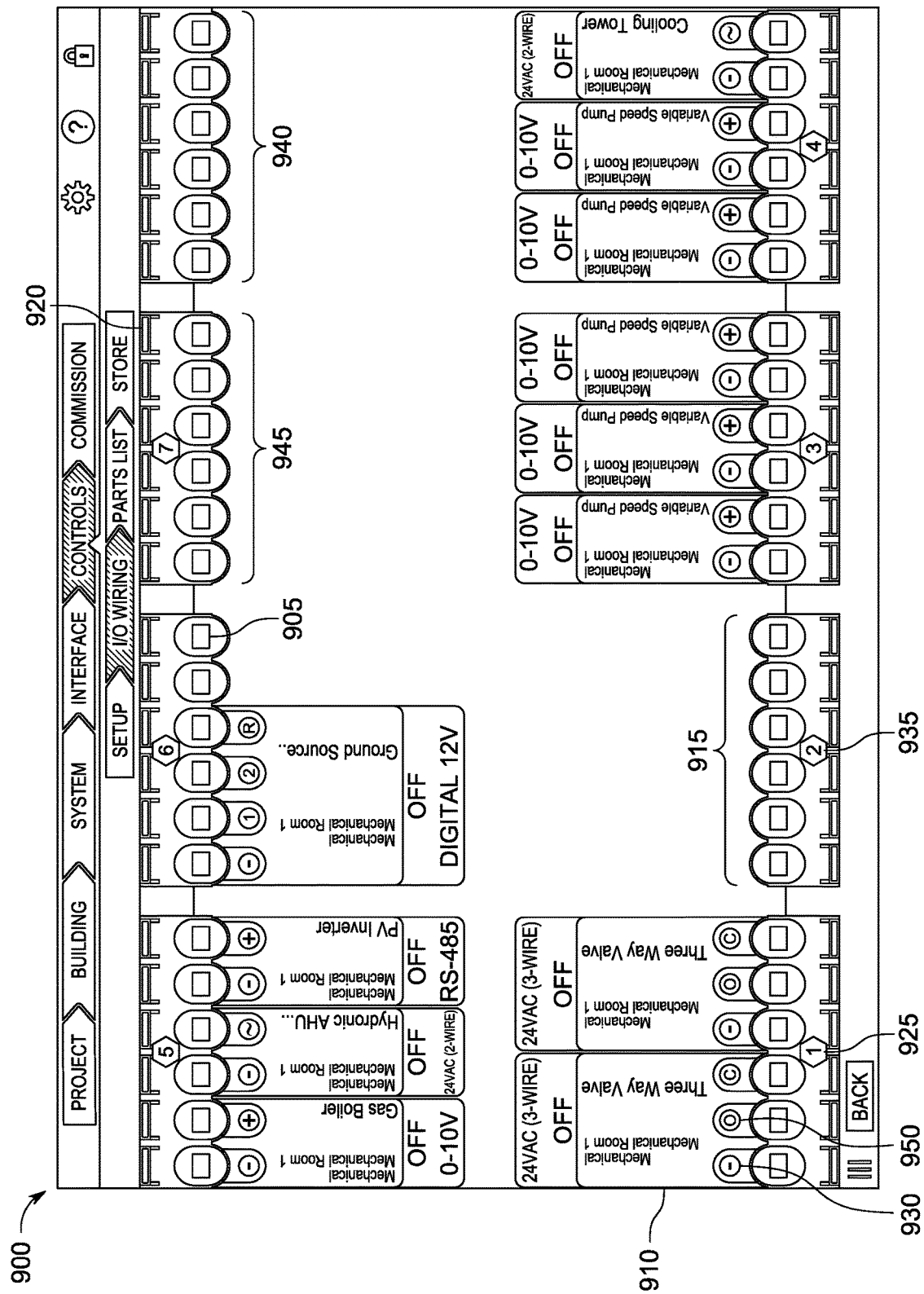
FIGS. 9 and 10 depict illustrative screenshot embodiments of a display that allows a user to setup and/or modify a controller resource layout.

FIG. 9 depicts an illustrative screenshot embodiment of a display that allows controller setup and maintenance. A user may use such a screenshot to tell the controller its expected resource layout; to modify a previously set up resource layout, to tell the controller that resources will be deleted, to change resource protocols, to change resource wire type etc. A controller connector 720 is shown at 920. This controller connector is attached to a resource connector 730, 905. Modules, e.g., 915, are indicated on the screen showing grouped, numbered 935 resource connectors 905. Controller screenshot 900 shows eight potential module locations, seven of which have modules in them; two of which are currently empty: 915 and 945; that is, they have no devices connected to them. Possible module location 940 has no module in the controller. This can be seen as it has no mark 935 indicating the module number. Module 915 has six resource connectors that will connect to resources. Other numbers of modules in a controller, and numbers of resource connectors in a module are also within the scope of this disclosure.

The external resources that are to be wired to the controller are shown as resource icons attached to their respective module connecters. At 910, for example, we can see that the external resource icon is a Three Way Valve, with a 24 VAC (3-wire) protocol. It is attached to module 1 925, and has three resource wires, with wire parameters of type (−) 930, (O) 950, and (C) from left to right, and which are in three distinct locations on the controller. When, for example, a resource wire is wired to the lower leftmost connection 820 of the controller, the controller knows that it is to be a wire on a Three-Way Valve, with protocol 24 VAC (3-WIRE) and the specific wire is to be of type (−). Using this information, the controller can see what information is on the wire when connected, what signals the wire accepts, and what signals the wire is expected to return, etc. When the wire is connected to the controller, the controller understands what to do to test if the correct wire has been connected to that direct controller location, e.g., using the controller computing environment 400.

If resource wires have been swapped on a resource (for example, the (−) and (O) wires are swapped such that the (O) wire is in the far lower left position 930, when expected to be in position 950, as expected, the controller may be able to determine this, as it has the information about what signals can be expected to be sent and received on the different resource wires. If the correct resource wire has been connected, then the controller may send a message to the module to tell an indicator 740 on a module 725 to signal that the correct wire is in place. In some embodiments, a controller connector directly tells an indicator state of the resource. In some embodiments, the indicator may indicate that the wire is correct with a light, such as a green LED light, a noise, etc. In some embodiments, the indicator may indicate that the wire is incorrect with a light, such as a red LED light, a noise, etc. An illustrative embodiment is shown in FIG. 7, where there are six indicators in the module, one for each of the wiring resource connector/wire connections. In some embodiments, when a wire is connected in the module (the module in the controller, the controller having been told what wire to expect) an LED light 740 will light up green if the correct wire is found to be connected (by the controller, module, or a combination) or will light up red if the correct wire is not found to be connected (by the controller, module, or some combination).

Once a controller has been wired with resources, the moveable interactive display may display the nature of the devices that are attached to the controller, where they are attached, information about the devices, information about the specific device wires, information about the current state of the device, etc.

A controller, e.g., may have databases of common resources stored within its memory 420 that a user can choose to add resources to the controller. The database may be distributed amongst controllers belonging to a distributed controller system. Users may be able to add resources to the database.

The user can also move devices around on the controller representation screen 900, which resets controller expectations of what each controller wire connection expects. A user may also swap wires on a specific device representation on the moveable interactive display, which will change the types of wires that the controller expects at the specific locations where the wires were swiped on the moveable interactive display. For example, the (−) wire 930 representation may be swapped with the (0) wire representation 950 next to it. This will change the protocol that the controller expects on those wires, and that is checked for when the device is wired to the controller. Whole devices can be moved. The three-way valve representation 910 can be moved by a user to, for example, three open slots on module 2 915 or module 7 945, etc. These changes will change the protocol that the controller expects on the eventual wires that the device representation is moved to. In some embodiments, the controller may send a signal through the module connector to the resource connector without making any changes. Similarly, in some implementations, a resource may send a signal to the controller through the module without the module making any changes.

Figure 10:
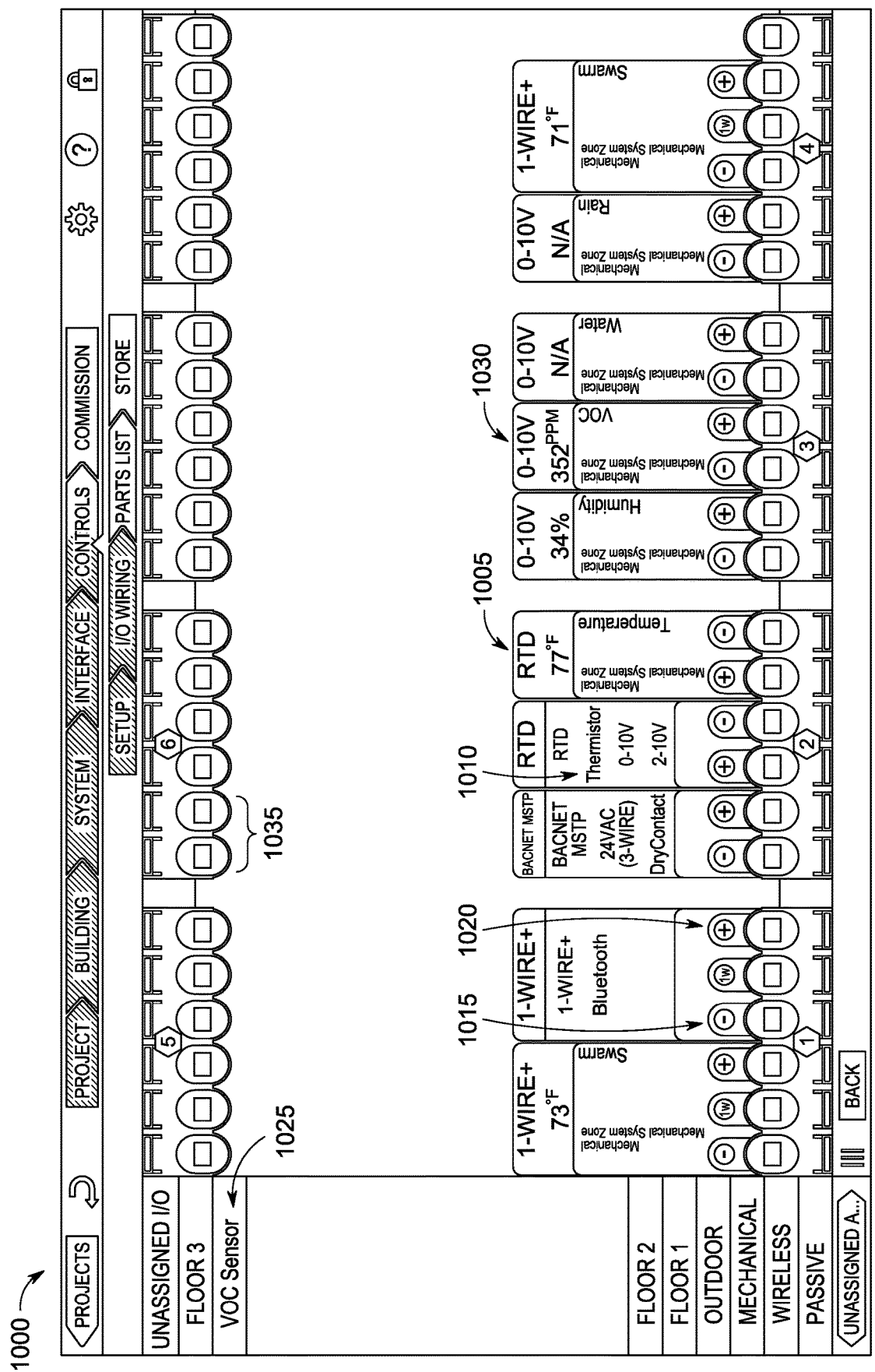

FIG. 10 is a screenshot of a display which allows controller setup and maintenance. One aspect of the display allows a user to change protocols that a controller expects for a device. In an embodiment, selecting a protocol tag 1005 on a display of a resource attached to a controller opens up a menu 1010 that shows the available protocols: in this case, RTD, Thermistor, 0-10V, and 2-10V. Selecting a protocol on screen changes the protocol that the controller expects to receive from the resource connector. Some protocols require that resource wires have a different protocol, which the controller understands. If a resource has multiple resource wires with different protocols, the wires can be moved within the resource. For example the (−) wire 1015 can be swapped with the (+) wire 1020. Resources, such as a VOC sensor 1025 that are expected to be connected to the controller but are not yet assigned a location on the controller may be accessible from a drawer, a panel, or may be accessible in a different manner. Such a resource may be able to be moved into an open position e.g., 1035, at which it may look similar to the icon VOC 1030.

Figure 11:
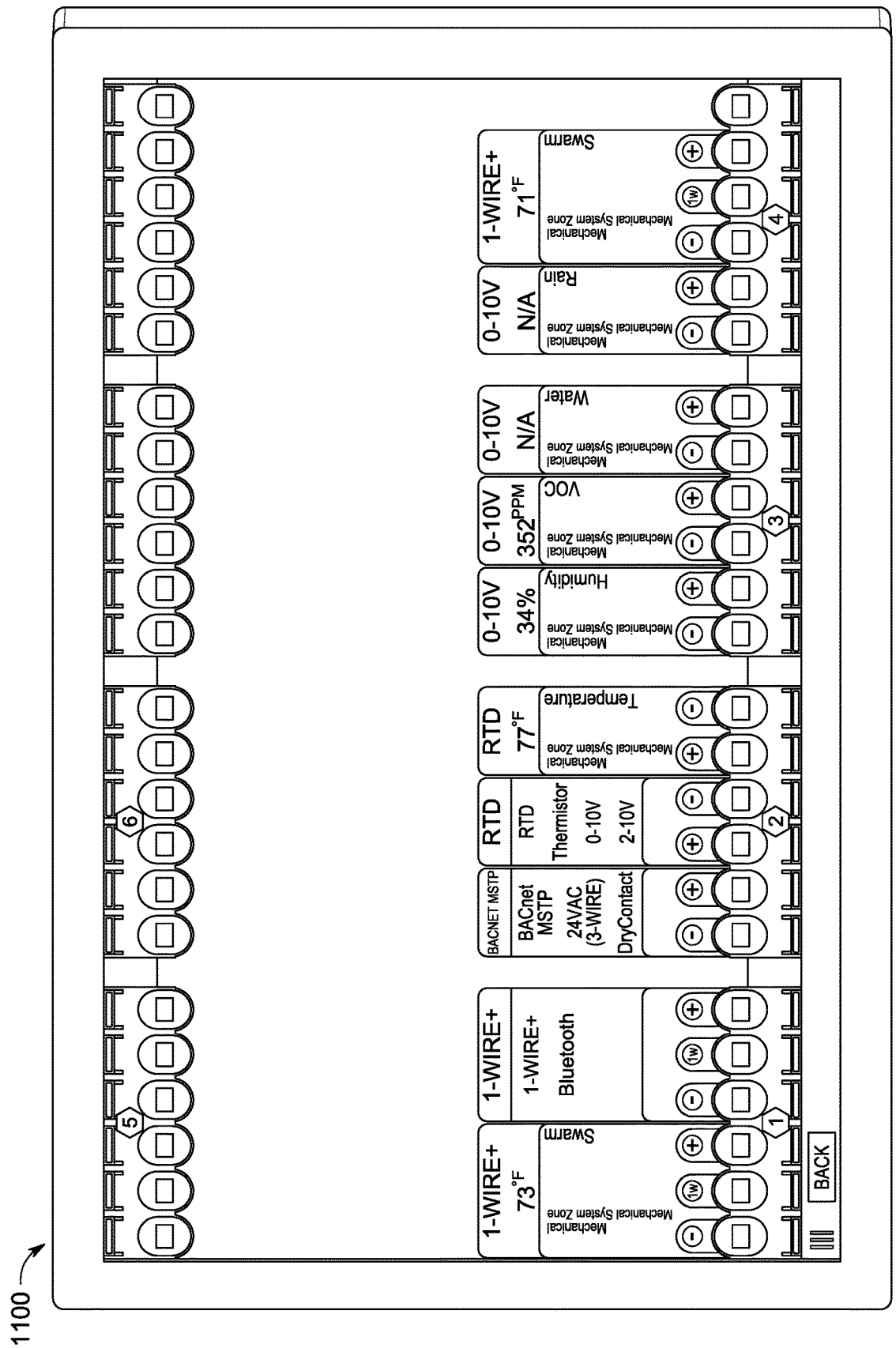
FIG. 11 is a view of the controller with the bulk of the device sitting within a wall cavity.

FIG. 11 is a view of the controller 1100 with the bulk of the device sitting within a wall cavity, such that only the screen is displayed when the screen is closed. This is an adaption that allows for setup of controller resource wires, setup of the locations of resources and the resources on the controller, or maintenance of the controller wires, or interaction with external resources. The screen, in some embodiments, may also be able to be opened up to maintain the resource wires and modules themselves, if being used. For example, a user interface associated with the interactive display (described with reference to FIG. 9) can assist installers in properly hooking up and wiring the building system controller by showing which resource wires are to be attached where. Once the building system controller is installed, a user interactive display may show one or more of: what devices have been installed on the controller, where devices are, what the specs of the installed wires are, wiring diagrams that describe where the devices are in the building, and other information associated with the controller and the devices.

In view of the many possible embodiments to which the principles of the disclosed invention may be applied, it should be recognized that the illustrated embodiments are only examples of the invention and should not be taken as limiting the scope of the invention. Rather, the scope of the invention is defined by the following claims. We therefore claim as our invention all that comes within the scope and spirit of these claims.

We claim:

1. A building system controller comprising:
a housing adapted to store a plurality of modules, the housing with computing hardware and programmable memory attached;
the housing having a front surface comprising a moveable interactive display moveably connected to the housing;
the housing having a controller connector attached to an inside surface, the controller connector providing a connection point for an external resource;
the housing adapted for setup or maintenance of the controller connector when the moveable interactive display is in an open position;
the moveable interactive display adapted for setup or maintenance of controller interaction with the external resource when the moveable interactive display is in a closed position; and
wherein the moveable interactive display is operationally able to move to display the controller connector and a screen associated with the moveable interactive display simultaneously.

2. The building system controller of claim 1, further comprising a module with a module connector and a resource connector, wherein the module connector is operationally able to connect the resource connector to wiring for the external resource.

3. The building system controller of claim 2, wherein the resource connector is operationally able to provide voltage monitoring.

4. The building system controller of claim 2, wherein the resource connector is operationally able to provide power monitoring.

5. The building system controller of claim 2, wherein the resource connector is operationally able to provide fault detection.

6. The building system controller of claim 1, wherein there are multiple controller connectors and wherein representations of the multiple controller connectors are displayed on the moveable interactive display.

7. The building system controller of claim 1, wherein the moveable interactive display is operationally able to allow a user to determine a protocol for the controller connector.

8. The building system controller of claim 7, wherein the moveable interactive display is operationally able to update when a new resource is attached to the controller connector.

9. The building system controller of claim 1, further comprising a second controller and wherein the building system controller is connected to the second controller.

10. The building system controller of claim 1, further comprising mains power and wherein the mains power is shut off when the moveable interactive display is in the open position.

11. The building system controller of claim 1, further comprising a hook tab that is operationally able to load a spring of a module operationally able to attach to the building system controller.

12. The building system controller of claim 11, further comprising a spring bar that is operationally able to load a spring of a module operationally able to attach to the building system controller.

13. The building system controller of claim 11, further comprising a wiring terminal attachment block that is operationally able to attach to a module with resource connectors that are operationally able to attach to a resource.

14. The building system controller of claim 1, further comprising mains power and wherein the mains power is shut off when the moveable interactive display is in the open position.

15. A building system controller comprising:
a housing adapted to store a plurality of modules, the housing with computing hardware and programmable memory attached;
the housing having a front surface comprising a moveable interactive display moveably connected to the housing, the moveable interactive display operationally able to display a controller setup and maintenance screen;
the housing having a controller connector attached to an inside surface, the controller connector providing a connection point for a module, the module comprising a module connector and a resource connector;
the housing adapted for maintenance of the resource connector when the moveable interactive display is in an open position; and
wherein the moveable interactive display is operationally able to move to display the controller connector and maintenance screen simultaneously.

16. The building system controller of claim 15, wherein the moveable interactive display is adapted for viewing a controller setup when the moveable interactive display is in a closed position.

17. The building system controller of claim 15, wherein the resource connector comprises current monitoring, voltage monitoring, power monitoring, or fault detection.

18. A building system controller comprising:
a housing adapted to store a plurality of modules, the housing with computing hardware and programmable memory attached;
the housing having a front surface comprising a moveable interactive display moveably connected to the housing;
the housing having a controller connector attached to a surface, the controller connector providing a connection point for an external resource;
the housing adapted for setup or maintenance of the controller connector when the moveable interactive display is in an open position;
the moveable interactive display adapted for setup or maintenance of controller interaction with the external resource when the moveable interactive display is in a closed position; and wherein the moveable interactive display is operationally able to move to display the controller connector and a screen associated with the moveable interactive display simultaneously.

19. The building system controller of claim 18, further comprising a wiring terminal attachment block that is operationally able to attach to a module with resource connectors that are operationally able to attach to a resource.

\* \* \* \* \*